A

LEAD   PILOT

ROBERT L. GEYER
RALPH A. LANDRUM
INVENTOR.

BY John D. Gassett

ATTORNEY.

ROBERT L. GEYER
RALPH A. LANDRUM
INVENTOR

BY John D. Gassett

ATTORNEY.

United States Patent Office 3,386,525
Patented June 4, 1968

3,386,525
SEISMIC EXPLORATION CONTROL METHOD
Ralph A. Landrum and Robert L. Geyer, Tulsa, Okla., assignors to Pan American Petroleum Corporation, Tulsa, Okla., a corporation of Delaware
Filed June 18, 1965, Ser. No. 465,036
14 Claims. (Cl. 181—.5)

ABSTRACT OF THE DISCLOSURE

This is an improved method of using a long time duration (e.g., 6 seconds) seismic signal in which a control signal representative of the desired input signal controls a hydraulic vibrator. This invention discloses a method of causing the vibrator output to more quickly follow and be in phase with the control or pilot signal. It has been found that it is more desirable to use an upsweep signal than a downsweep signal. It has also been found that it takes longer with conventional systems to lock the vibrator to the upsweep control signal than to a downsweep control signal. To overcome this problem, a short duration (e.g., one second or less), weak lead signal starts at a high frequency and then drops rapidly to a lower frequency to smoothly enter the lowest frequency of the pilot signal. The vibrator is locked to the lead signal and is completely in phase by the time the pilot signal is reached. The vibrator imparts a low level of energy during the lead signal and a high level of energy during the pilot signal. Preferably, only the pilot signal is used in correlation with the received signal.

---

This invention relates to the field of seismic prospecting, and more particularly, it relates to a method of prospecting in which a long-time duration seismic signal is imparted into the earth and in which reflections of such input signals are detected and the detected signal processed. It relates especially to a method of locking a transducer, such as a hydraulic vibrator, in phase with the signal used to control the transducer.

Geophysical prospecting, using artificially induced seismic disturbances, has found widespread applications in the search for petroleum. It is the general practice to initiate a seismic disturbance at a point near the surface of the earth to direct the seismic waves downward into the earth from that point. A method which has recently attracted considerable interest is to couple a hydraulically actuated vibrator to the earth and control the vibrator with a pilot or a control signal. The pilot signal may last from one to six seconds, or more. The seismic waves, which are directed downwardly, continue to travel until they encounter discontinuities in the earth's structure in the form of various subsurface formations. These discontinuities have the effect of reflecting a portion of the seismic waves back toward the surface of the earth. By arranging a plurality of geophones at a distance remote from the seismic disturbance point, it is possible to detect the arrival of the reflected seismic waves at the surface of the earth. These detected waves are translated into electrical impulses which are indicative of the character of the ground motion and are usually referred to as a seismic signal or a seismic record which is, in effect, a composite signal made up of a plurality of electrical signals varying in frequency and in amplitude.

The use of vibrators has a handicap in that the power input is low; thus, if vibrators are used, the input signal must have a long-time duration to obtain the total required energy. As we have said, when vibrators are used, a control or pilot signal controls the movement of the vibrator so that the signal imparted into the earth faithfully follows the control signal. Thus, when using a low-energy source, such as a vibrator, in comparison to an explosive charge, such as dynamite, one must use a long-time duration signal to obtain the required total energy. If the pilot signal is of a long duration, then one loses the advantage of high resolution of the ability to determine exactly when the long signal occurs in the record; that is, when the reflected signal is detected at the surface.

Thus, if one wishes to use a vibrator, such as a commonly used hydraulically driven vibrator for imparting a seismic signal into the earth which necessitates a control signal of long duration, then one is required, in effect, to shorten or compress the long detected signal. One way of accomplishing this, which has become fairly popular, is to choose as a pilot signal a sweep frequency signal which sweeps linearly from one frequency $f_1$ to a second frequency $f_2$ in normally about six or seven seconds. The pilot signal is then cross-correlated with the received signal.

In the prior art system, the pilot signal and received signal are recorded on the same physical recording medium. In other words, the pilot signal is pre-recorded on a recording medium and is reproduced to control the vibrator. Simultaneously with starting the reproduction of the pilot signal, the geophones or detectors are connected to a recording head which is placed along side the reproduction head of the pilot signal. The pilot signal is autocorrelated to determine a zero time base for the recorded reflected signal. Then a substantial portion of the total transmitted energy detected and recorded is cross-correlated with the input pilot signal or its counterpart. The cross-correlation produces prominent amplitude variations which indicate the reflections of the input signal. The time between prominent amplitude variations and the zero time base, as determined by the autocorrelation, is used as a parameter of the travel time of the signal between the input point and the receiving point.

Theory of correlation between two signals, or autocorrelation of one signal with itself, is well known and simply stated, is the operation of measuring the similarity between the two wave forms. If two wave forms $g(t)$, the pilot signal for example, and $r(t)$, the received signal for example, are considered within the time interval T, the finite cross-correlation function is expressed mathematically by $$\phi gr(\tau) = \frac{1}{T}\int_0^T g(t)r(t+\tau)dt$$

The evaluation involves multiplication of corresponding ordinates and summing of the products for each of the many values of $\tau$. While the method described immediately above is finding fairly extensive use, it is nevertheless not without certain shortcomings or difficulties. Considerable difficulty has been experienced in causing a hydraulically driven vibrator to faithfully follow the pilot signal for the entire duration. It is especially difficult to have the first several cycles of the sweep pilot signal to be in phase with the output of the vibrator which is the input seismic signal to the earth. If the vibrator does not closely follow the pilot signal, the difference in phase seriously affects the cross-correlation. A method which is currently being used is to place an earth input detector adjacent the vibrator so that its output is in the form of the input signal to the earth, and compare it with the pilot signal for phase difference. Before the pilot signal is fed to the controls of the vibrator, its phase is shifted as necessary to be in phase with the vibrator output. It is convenient to put the output detector on the base plate on the vibrator, for example. Even with this system it takes several cycles before the vibrator output is in phase with the control or pilot signal.

Two of the more popular forms of the pilot signal can be classified as an upsweep signal and a downsweep signal. The upsweep signal starts at a low frequency and changes frequency linearly with time to a higher frequency. The downsweep signal starts at the higher frequency and progresses linearly to the lower frequency. It has been found that a downsweep control signal produces ghost signals on the useful part of a correlogram due to the high frequency part of the signal having correlation contributions when aligned with the harmonics of the low frequency part of the reflected signal which, for example, are introduced by non-linearity of the coupling of the vibrator to the ground. However, a downsweep pilot signal can be locked into phase with the vibrator much more quickly than an upsweep signal, mainly because the cycles required for locking in at high frequency occur much quicker in time than do the low frequency cycles. It has been determined experimentally that the length of signal required to lock in a given hydraulically operated vibrator is about a constant number of cycles regardless of the frequency. As a high frequency signal has a shorter period of oscillation than a low-frequency signal, a shorter time is required to lock in at high frequencies. Because of the difficulty of locking in the pilot signal with the vibrator, downsweep signals are nearly universally used as the pilot signal in the method of the prior art described above. However, as it is much preferred to have an upsweep signal, it is seen that there is a very definite need for a method whereby the upsweep pilot signal can be locked in with the vibrator at essentially the beginning of the pilot signal. The invention disclosed herein provides such a method.

In a preferred form of operation of our invention, we use an upsweep pilot signal preceded by a lead signal. The pilot signal is preferably a sine wave with linearly increasing frequencies from $f_1$ to $f_2$. The lead signal begins at a frequency which is much higher than the beginning frequency $f_1$ of the pilot signal, and decreases quickly to frequency $f_1$. The vibrator thus quickly locks in phase with the higher frequency of the lead signal. The vibrator is very closely following the leading signal at the time the pilot signal is introduced. Precautions are taken so that the lead signal does not seriously impair the quality of the correlation. For example, it will be seen, the duration of the lead signal is short compared to the time duration of the pilot signal so that it gives little influence in the correlation process. Alternatively, the lead signal can be of much lower amplitude than the pilot signal, thus, further reducing any effect of the lead signal in the correlation process.

Various objects and a better understanding of the invention can be had from the following description taken in conjunction with the drawings in which.

Figure 1:
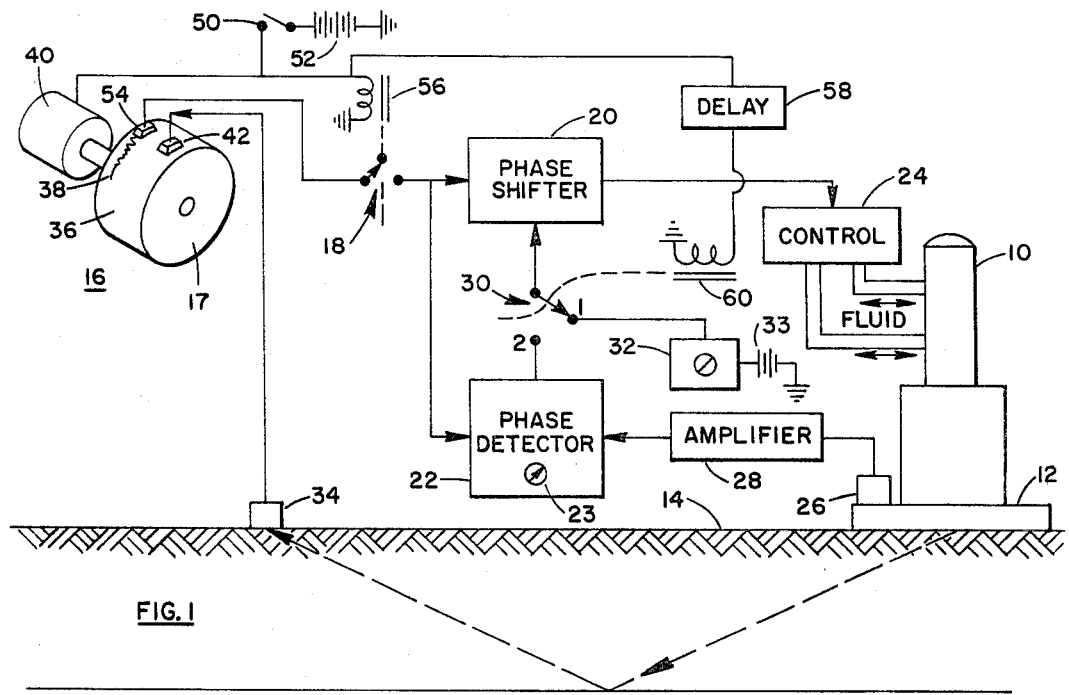
FIGURE 1 is a schematic diagram of a system on which the method of this invention can be practiced.

Attention is first directed to FIGURE 1 which illustrates a system for producing a seismic input signal. Shown thereon is a vibrator 10 having a vibration or impact plate 12 resting upon the surface of the ground 14. Vibrator 10 is preferably a hydraulically driven vibrator which has control means for following an electrical control or pilot signal. A suitable vibrator is commercially available from George E. Failing Company, Enid, Okla., Model Y-600 Vibrator or from Seiscor Division of Seismograph Service Corporation, Box 1590, Tulsa, Okla., their Model VIBC Servo Hydraulic Vibrator. Reproducing and recording means 16 is provided and includes a drum 17 having a multichannel multitrack magnetic recording tape 36 mounted thereon. Drum 17 is rotated by motor 40 upon closing switch 50 which connects the motor to a power source 52. The pilot signal is placed on one track 38 of tape 36. A reproducing head 54 is positioned above track 38. A plurality of recording heads 42 (only one shown) is provided adjacent to and aligned with reproducing head 54. The control signal output from channel 38 is fed through switch 18 when closed to a phase shifter 20 and also to one input of a phase detector 22 whose output is a function of the difference in phase between two input signals. Phase detectors and phase shifters are well known and are commercially available. Detector 22 is also provided with an indicator 23. The output of phase shifter 20 is electrically connected to control means 24 for vibrator 10.

Also indicated in FIGURE 1 are geophones 34 (only one shown) for receiving reflections from interfaces of the transmitted input signal from vibrator 10. The outputs of geophones 34 are recorded individually on tracks of recording medium 36 adjacent channel 38 on which the control signal has been placed. The output of geophone 34 is connected to recording head 42 which is adjacent reproducing head 54. Normally there will be a large number of recording heads 42, for example, twenty-four. Thus, timewise on the recording tape the recording of the detected reflected signals are in their proper positions relative to the beginning of the pilot signal.

It is desired to compare the phase of the pilot signal with the ground input signal from the vibrator. To accomplish this a geophone or other suitable transducer 26 is provided on base plate 12 of the vibrator. The output of geophone 26 is connected to an amplifier means 28 whose output is connected to phase detector 22. The output of phase detector 22 is fed through switch 30 when in its No. 2 position to phase shifter 20. If there is a difference in phase between the earth input signal and the pilot signal, the phase shifter automatically makes an adjustment in accordance with the output of phase detector 22.

Due to various inertia, frictions and compliances of vibrator 10, the output of the vibrator will not be in phase with the output of reproducing means 16 unless corrections are made. At the very beginning of the control signal no reliable correction voltage is available from phase detector 22. Therefore, it is a preferred practice to provide a pre-set phase shifting voltage to shifter 20 for a set period of time at the beginning of the output of control signals from source 16. This pre-set voltage is provided by a potentiometer 32 connected to a constant voltage source 33, through switch 30 in its No. 1 position to phase shifter 20. Then after a pre-determined time the pre-set voltage is switched out and the voltage output from phase detector 22 is switched into the control input of phase shifter 20. The level of such voltage initially applied to the phase shifter 20 is easily determined experimentally in a method shown hereinafter.

A selected signal is fed through phase shifter 20 to control 24. The particular signal fed to the control of the vibrator for this determination is the first portion of the signal which is automatically fed to the system when switch 50 is closed which starts motor 40 so that the signal on channel 38 is reproduced. The closing of switch 50 also provides power from voltage source 52 simultaneously to relay 56, and through delay means 58 to relay 60. When energized relay 56 closes switch 18 and relay 60, when energized, places switch 30 in its No. 2 terminal. The moving of switch 30 from its No. 1 terminal to its No. 2 terminal affects the switching out of the pre-set phase adjusting voltage which was applied to control phase shifter 20 and connects thereto the output of phase detector 22. As will be seen, delay 58 is of a sufficient duration to permit phase detector 22 to make a comparison between the output of detector 26 and the control signal before the pre-set voltage from potentiometer 32 is removed from controlling phase switch 20 in favor of the output of phase detector 22. The delay is normally equal to the duration of about one cycle of the lead signal.

In determining the pre-set phase-compensating voltage, an arbitrary voltage is first applied from source 33 through switch 30 in position 1 to control phase shifter 20. Switch 50 is then closed. This results in the lead signal being reproduced by head 54 and fed to phase shifter 20 and to phase detector 22. At this time before switch 30 shifts to position 2, phase detector 22 has a voltage appearing at terminal 2 of switch 30. This voltage is a function of the phase between the signal detected on the plate of vibrator 10 and the reproduced signal. After a predetermined delay after closing switch 50, switch 30 is shifted to its position 2. The voltage appearing on terminal 2 then controls the phase shifter 20. At this time the indicator 23 on the phase detector 22 is closely observed to see if there is any shift in its position caused by switch 30 changing its position to terminal 2. No movement of indicator 23 indicates that the pre-set voltage is correct. If on the other hand indicator 23 moves, it is known that the arbitrary voltage selected from source 33 by the setting of potentiometer 32 is not correct. In this event, potentiometer 32 is set to produce another arbitrary voltage at terminal 1 of switch 30. Additional arbitrary voltages are thus placed on terminal 1 and the process repeated until the correct voltage has been arrived at which is indicated by detector 23 not moving upon the shifting of switch 30 from terminal 1 to terminal 2.

Figure 2:
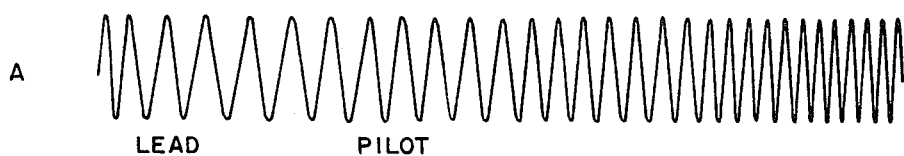
FIGURE 2 illustrates curves useful in explaining the pilot and lead signals.
Figure 2:
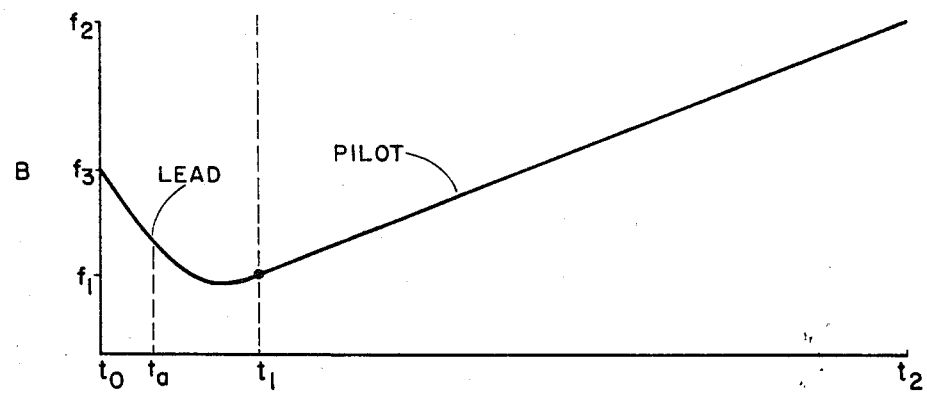

It is to be noted that even with this pre-set phase adjusting voltage that it takes several cycles of the control signal before the vibrator is locked into phase with the control signal. By the use of our invention, the vibrator is locked in phase with the lead signal and by the start of the pilot signal the vibrator is closely following the output signal from channel 38 of recording tape 36. Attention is now directed toward FIGURE 2 for a more complete discussion of the lead signal and its relation to the pilot signal. Shown in FIGURE 2 as Curve A is a sinusoidal wave form illustrating the lead signal and pilot signal. The frequency time graph of this lead and pilot signal is shown as Curve B. The pilot signal begins at a low frequency $f_1$ at time $t_1$ and increases linearly to a higher frequency $f_2$ at time $t_2$. Typical values of $f_1$ and $f_2$ are 20 and 80, respectively. The lead signal begins at a frequency $f_3$ which is greater than $f_1$ and is also at a high enough frequency to quickly lock the vibrator into phase with the lead signal. As the lead signal is reproduced first, it is the lead signal which is used in determining the pre-set phase adjusting voltage as discussed above.

The lead signal preferably decreases from $t_0$ to $t_1$ as a second degree function so that at $t_1$ the frequency is $f_1$, which is also the same frequency as the beginning of the pilot signal. A second degree function is especially good as it presents a continuous—but not abrupt—change of frequency to the vibrator and feedback system. Accordingly the lead signal can comprise a short initial downsweep linear element, or section, from $t_0$ to $t_a$ and a nonlinear transition element, or section, from $t_a$ to $t_1$ having a quadratic frequency-time relation. The transition section is tangent to the downsweep element at $t_a$ and to the linear upsweep signal at $t_1$. A very suitable transition section follows the shape of a parabola. The lead signal functions primarily to cause the vibrator to lock in with the signal coming from the control unit so that it will faithfully follow the pilot signal. The time duration of the lead signal compared to the duration of the pilot signal is very small, normally being about one second or less. The pilot signal is normally six to seven seconds in duration. For best correlation of the received signal with the pilot signal, it has been found that the pilot signal should increase linearly from $f_1$ at time $t_1$ to $f_2$ at time $t_2$.

Some of the frequencies used in the lead signal may also reappear in the pilot signal. However, because of the relative time durations of the two signals, ghosting caused by the lead signal should be slight. Ghosting, as used here, refers principally to small lobes produced upon cross-correlation caused by the same frequency appearing more than once in the duration of the input signal, or the control signal or a coincidence of the same frequency more than once during correlation time. Normally, upsweep signals have very little ghosting problems. Normally then, the lead signal and the pilot signal can both be used as a correlation function $g(t)$ to be correlated with the received signal $r(t)$. If in a particular instance ghosting should be a problem, such ghosting can be minimized in different ways. For example, the pilot signal alone, i.e., without the lead signal, can be used as the correlating function $g(t)$. In this event, only the upsweep portions of the signal fed to the vibrator are used for correlation. Then, any harmonic ghosts precede the main events and thus interfere less with other events than if the ghosting followed the main events where the returning or detecting energy is weaker. Another way of minimizing the ghosting is to make the amplitude of the lead signal so small that the vibrator will respond sufficiently to lock into phase with the signal but still not put any appreciable energy into the ground.

Figure 4:
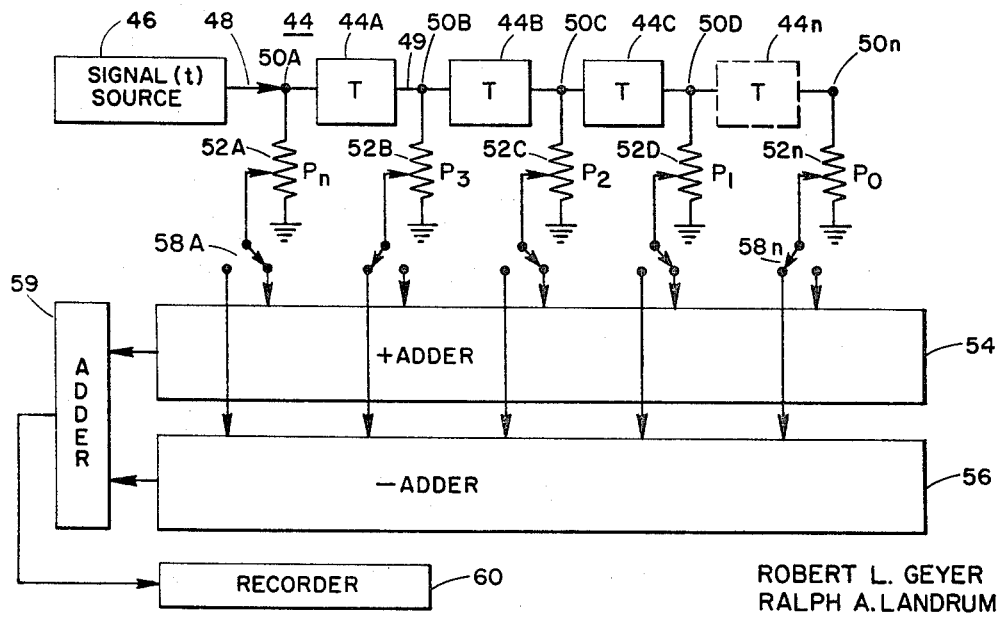
FIGURE 4 illustrates a typical apparatus upon which correlation of the signals can be made.

Attention is now directed toward FIGURE 4 which shows an apparatus suitable for one form of correlation. FIGURE 4 illustrates a device on which the received signal $r(t)$ can be cross-correlated with the pilot signal $g(t)$. This apparatus is similar to a system described in copending application S.N. 358,870, filed for Daniel Silverman, Apr. 10, 1964. Shown in FIGURE 4 is an electric delay line 44 which is comprised of a series of delay units 44A to 44n, such as lumped inductance-capacitance networks for time delay of an analog signal representative of a first function, such as the received signal $r(t)$ which is fed into the apparatus from reproducing means 46. Each delay line unit provides a specific known time delay T which, for example, can be from one to about four milliseconds. These delay line units are connected in series to provide the total time delay desired which typically is at least about equal to the duration of the received signal which may be as long as fourteen to fifteen seconds. For the sake of brevity, only a small number of delay units 44 are shown; however, in practice a sufficient number will be used to obtain the total required delay. The first delay unit is connected to reproducing means 46 by an electrical conductor 48. The various delay units are connected by electrical conductors 49 to form a continuous circuit. Multiple take-out taps 50A to 50n are spaced along the delay line to present at specific time delays the signal voltage applied to the delay line after transmission over a preceding portion of the line.

A plurality of potentiometers 52A to 52n are respectively connected to taps 50A to 50n. The potentiometer taps are set proportionally to digital representations or time separated ordinates $P_0$ to $P_n$ of the pilot signal. In other words, the correlation function $g(t)$ is set into the apparatus in digital form by adjusting the ratio values of the potentiometers. The output of each potentiometer 52A to 52n is electrically connected either to adder 54 or negative adder 56. Since the values of $P_0$ to $P_n$ may be positive or negative, switches 58A to 58n are provided to connect the output of the potentiometers to either the positive adder 54 or to the negative adder 56. The outputs of the two adders are then added in proper sign by adder 59 to provide the true output of the correlation. The principle of adders for obtaining an algebraic summation of signals is well known; for example, reference is made to U.S. Patents 2,557,070 and 2,838,742. The output of adder 59 is recorded on recording means 60. The signal recorded on recorder 60 is the signal obtained by cross-correlating the signal $r(t)$ with the signal $g(t)$.

Figure 3:
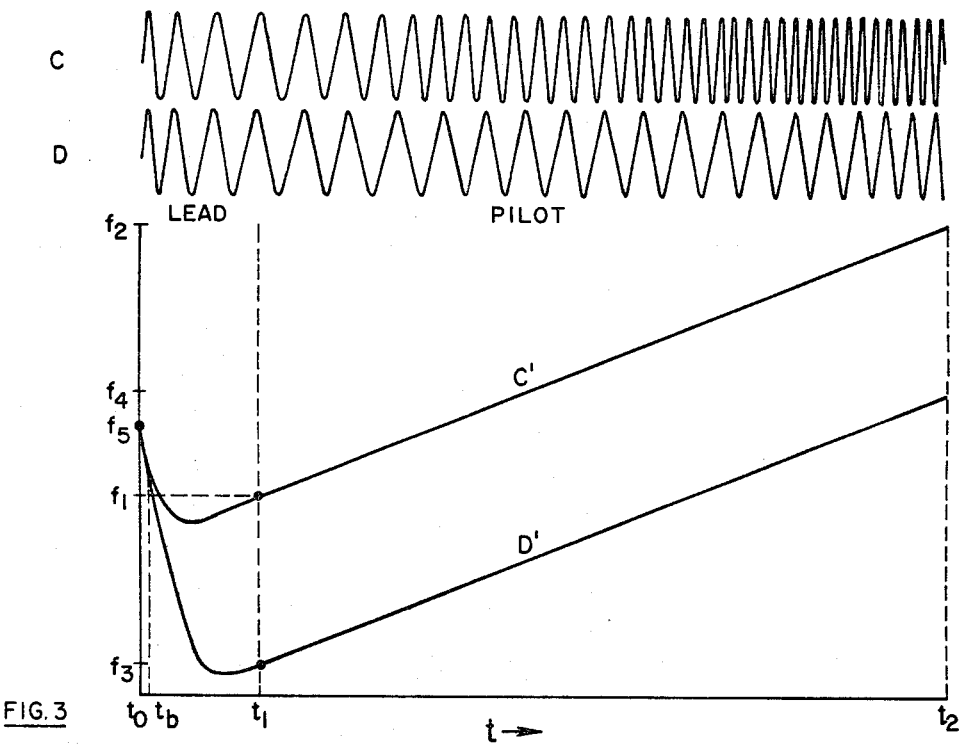
FIGURE 3 shows additional curves in which two sweep frequencies can be used at one location and in which the lead signal for each pilot signal begins at a common frequency.

In some areas of seismic prospecting, it is desirable to use two or more separate pilot signals at each location of the vibrator. These are represented in FIGURE 3 as part of wave form C and D in the time domain and C' and D' in the frequency-time graph. Without our invention, the beginning frequencies $f_1$ and $f_3$ of the signals C and D are different. This would require a separate pre-set phase adjustment of potentiometer 32 for each sweep. However, separate adjustments can be eliminated in accordance with our invention by beginning the lead signals for each signal C' and D' at a common frequency $f_5$. As can be clearly seen in FIGURE 3 the lead signal between $t_o$ and $t_b$ is identical for both curve C' and D' and can be referred to as the initial downsweep linear elements. In operation of the device, in FIGURE 1 potentiometer 32 is pre-set to compensate for the inherent out-of-phaseness of the vibrator and the initial downsweep linear element from the control signal 16. This same pre-set signal is fed to phase shifter 20 for the pilot signal curve C and pilot signal of curve D. Each pilot signal indicated in curves C and D is used in the same manner as pilot signal of curve A of FIGURE 2 to control the vibrator 10 of FIGURE 1 when the resultant reflected waves are recorded on recording channel of recording means 36. The recorded received signals $r(t)$ are cross-correlated then with their respective pilot signals or with a signal whose dominant part comprises the pilot signal. The relation of the lead signal and the pilot signal here are the same as that discussed in regard to FIGURE 2. In FIGURE 3 in the frequency-time graph the pilot signal of curves C' and D' are shown to be non-parallel. However, in practice these two curves may be parallel, or for example, might even cross.

By the use of our invention it is seen that we have made possible increased choices of pilot signals. For example, the much preferred upsweep signal can be used. Further, upsweep signals having different initial frequencies can be used without having to make separate pre-set phase shifting determinations and adjustments.

While there are disclosed above a limited number of illustrations and descriptions of this invention, various modifications can be made thereto without departing from the spirit and scope of the invention.

We claim:

1. A method of seismic prospecting using a transducer for imparting a seismic signal into the earth, said transducer being controlled by a pilot signal which increases from a frequency of $f_1$ to a frequency of $f_2$ in a period of time $t$, the improvement which comprises:
   (a) driving said transducer with a lead signal having a duration less than the time $t$ and beginning at a frequency in excess of $f_1$ and terminating at a frequency of $f_1$;
   (b) immediately at the end of said lead signal driving said transducer with said pilot signal; and
   (c) recording signals from said transducer reflected from a subsurface interface.

2. A method as defined in claim 1 in which the pilot signal changes linearly from frequency $f_1$ to frequency $f_2$.

3. A method as defined in claim 1 in which the recorded signal is cross-correlated with the pilot signal alone.

4. A method as defined in claim 1 in which the pilot signal is much stronger than the lead signal.

5. A method as defined in claim 1 in which said lead signal is not over about one second in duration and the pilot signal is at least about six seconds.

6. A method as defined in claim 2 in which the lead signal comprises a short initial linear downsweep section and a non-linear transition section; the transition section having a quadratic frequency-time relation tangent to the linear time-frequency relations of the initial downsweep section and to the main pilot signal.

7. A method as defined in claim 6 in which the transition section is parabolic.

8. A method of seismic prospecting using a transducer for imparting a seismic signal into the earth in which at one location the transducer is controlled first by a first pilot signal which changes from a frequency $f_1$ to a frequency $f_2$ and subsequently at the same location by a second pilot signal which changes from a frequency $f_3$ to a frequency $f_4$, the improvement which comprises:
   (a) driving said transducer at said location with a first lead signal which varies in frequency from a beginning frequency $f_5$ and terminating at a frequency of $f_1$;
   (b) immediately at the end of said first lead signal driving said transducer with said first pilot signal;
   (c) thereafter driving said transducer at the same location with a second lead signal beginning at a frequency $f_5$ and terminating at a frequency of $f_3$;
   (d) immediately at the end of said second lead signal, driving said transducer at the same location with said second pilot signal; and
   (e) recording signals transmitted by said transducer and reflected from a subsurface interface.

9. A method as defined in claim 8 in which the pilot signals are much stronger than the lead signals.

10. A method as defined in claim 8 in which the recorded signals are correlated with signals consisting of their respective pilot signals.

11. A method as defined in claim 8 in which the lead signals are not over about one second in duration and the pilot signals are at least about six seconds in duration.

12. A method as defined in claim 8 in which the frequency $f_5$ is in excess of the larger of $f_1$ and $f_3$.

13. A method as defined in claim 8 in which each lead signal comprises an initial linear downsweep portion and a non-linear transition linear section, the transition portion having a quadratic frequency time relation tangent to the linear time-frequency relations of the initial downsweeping portion and to the main linear upsweeping pilot signal.

14. A method as defined in claim 8 in which said first pilot signal sweeps linearly from a lower frequency $f_1$ to a higher frequency $f_2$ and said second pilot signal sweeps linearly from a lower frequency $f_3$ to a higher frequency $f_4$.

References Cited

UNITED STATES PATENTS

| 2,275,735 | 3/1942 | Cloud | 181—5 |
| 2,281,751 | 5/1942 | Cloud | 181—5 |
| 2,688,124 | 8/1954 | Doty et al. | |
| 2,989,726 | 6/1961 | Crawford et al. | 340—15.5 |
| 3,208,545 | 9/1965 | Doty et al. | 181—5 |
| 3,229,784 | 1/1966 | Lyons et al. | 181—5 |

RICHARD A. FARLEY, *Primary Examiner.*

BENJAMIN A. BORCHELT, RODNEY D. BENNETT,
*Examiners.*

M. F. HUBLER, *Assistant Examiner.*